March 24, 1936. S. D. BUTTERWORTH 2,034,893
CAR LOADING DEVICE
Filed Aug. 14, 1931
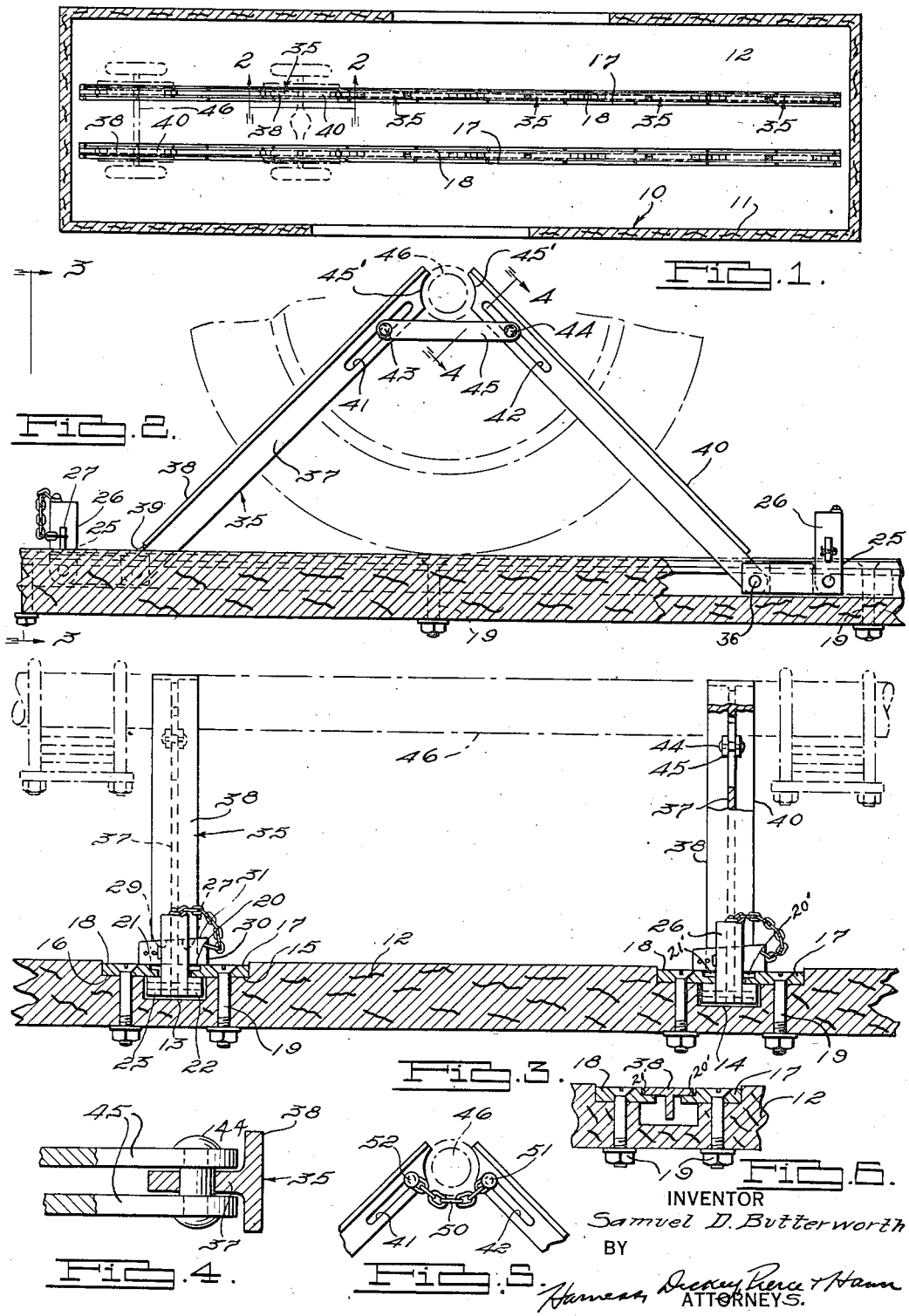
INVENTOR
Samuel D. Butterworth
BY
ATTORNEYS.

Patented Mar. 24, 1936

2,034,893

UNITED STATES PATENT OFFICE 2,034,893

CAR LOADING DEVICE

Samuel D. Butterworth, Detroit, Mich., assignor, by mesne assignments, of ninety-nine per cent to The Worth Company, a corporation of Michigan Application August 14, 1931, Serial No. 557,054

3 Claims. (Cl. 105—368)

The invention relates to loading devices and it has particular relation to devices for loading and securing motor vehicles in freight cars when such vehicles are transported from one place to another.

In certain respects the invention is similar to and constitutes an improvement over that embodied in the patent to Mills, et al., 1,778,162 issued October 14, 1930.

The principal objects of the invention are to provide an improved means for securing motor vehicles to the floors of freight cars which is of simple and inexpensive construction, easy to operate and very durable; to provide a device of this character which positively secures the motor vehicle in a predetermined position against rolling and other movements that might occur during transportation thereof if it were not firmly secured in its transporting position; and to provide a car loading device of the above designated character which, in its inoperative position assumes a non-interfering position in the groove in the floor of the car, and presents a surface above the groove substantially flush with the floor.

For a better understanding of the invention reference may be had to the accompanying drawing forming a part of the specification, wherein:

Figure 1 is a longitudinal cross-sectional view of a freight car having car loading devices therein constructed according to one form of the invention;

Figure 2 is a cross-sectional view on a larger scale taken substantially along line 2—2 of Figure 1;

Figure 3 is a cross-sectional view, taken substantially along line 3—3 of Figure 2;

Figure 4 is a cross-sectional view on a larger scale, taken substantially along line 4—4 of Figure 2;

Figure 5 is a fragmentary view illustrating a different form of the invention, wherein the vehicle axle securing arms are connected by means of a chain instead of a link as shown by Figure 2;

Fig. 6 is a cross-sectional view illustrating the groove in the floor and one of the supporting members therein.

Referring to Figure 1, a freight car is illustrated at 10 and has the usual side walls 11 and floor 12. The floor 12, as best shown by Figure 3, is provided with laterally spaced, longitudinally extending grooves 13 and 14 which are substantially channel shaped in cross section. Car loading devices are associated with these grooves, and the assemblies with respect to both grooves being identical, such devices will be particularly described with respect to only one groove.

Referring to Figure 3, the floor 12 of the car, at each side of the groove 13 is provided with cutaway portions 15 and 16 and in such cutaway portions longitudinally extending strips of metal 17 and 18 are disposed and secured to the floor of the car by means of bolts 19 extending through the strips and the floor. The strips 17 and 18 are substantially flush with the upper surface of the floor and project toward each other laterally over the groove 13 as indicated at 20 and 21, thereby providing a groove of undercut character. At their adjacent edges, the strips 17 and 18 are formed with recesses 20' and 21' in their upper surfaces. Elongated bars 22 and 23 are disposed in the groove and under the projecting portions 20 and 21 of the strips 17 and 18, and such bars are pivotally connected intermediate their ends by means of a pin 25, to a bar 26 projecting upwardly between the adjacent edges of the portions 20 and 21. From the description so far given, it is apparent that the bar 26 may be moved downwardly between the portions 20 and 21 of the metal strips, and into a position where it is concealed by the groove 13.

Outwardly from the pin 25, the bar 26 is provided with a transversely extending slot 27 which, as best shown by Figure 3, has a slightly inclined outer wall 29. When the bar is disposed substantially in vertical position, the bottom wall of the slot 27 is located slightly below the upper surfaces of the metal strips 17 and 18, while the inclined surface 29 is vertically spaced above the strips. The slot 27 is adapted to receive a wedge pin 30 having an inclined upper edge 31 substantially complementary to the inclined upper wall of slot 27 and which is adapted to cooperate therewith. When the pin 30 is moved through the slot, the upper inclined wall 31 thereof cooperates with the upper inclined wall 29 of the slot and wedges the pin between such wall and the upper surfaces of metal strips 17 and 18. Naturally, this tends to force the bar upwardly, and since it is connected by means of the pin 25, to the elongated bars 22 and 23, the upper edge surfaces of the latter will be drawn tightly against the lower surfaces of the portions 20 and 21 of the metal strips 17 and 18. In this manner the assembly, which may be called an anchor block is strongly bound to the metal strips 17 and 18.

Spaced pairs of the elongated bars 22 and 23 in groove 13, at one end are pivotally connected, as best shown by Fig. 2, to T-shaped links or beams 35 and 40 by means of a pin or rivet 36 extending through the bars and the leg of the beam indicated at 37. Adjacent the pin 36, the cross bar of the beams, indicated at 38, is removed, as indicated at 39 in Figure 2, to permit pivotal movement of the beams with respect to the bars 22 and 23.

Adjacent their upper ends, the beams are provided with elongated slots 41 and 42 provided in the leg portions thereof and such slots respectively are adapted to slidably accommodate pins 43 and 44 connected to opposite ends of a link 45. The leg portion of each beam at the extreme upper end thereof, is formed with an arcuate edge as indicated at 45' and the latter is complementary to an axle 46 of a motor vehicle. The curved edges 45' of both beams are adapted to cooperate with opposed sides of axle 46 while the link 45 is adapted to abut the lower side of the axle.

When the loading devices are not in use, the wedge pins 30 are removed from the bars 26, and then the anchor blocks may be moved longitudinally of the groove into any positions desired. Then the bar 26 may be pivoted about the pin 25, and it and the wedge pin 30 moved into the groove and into out-of-the-way positions. Similarly, the beams 35 and 40 when disengaged from the axle 46 may be moved downwardly until they are positioned in the groove and in out-of-the-way positions, and when so positioned, the cross bars 38 of the beams fit the recesses 20' and 21' and close the groove extending commensurately therewith. Hence, when the devices are not being used the floor of the freight car is free from obstruction and may be used in the ordinary manner.

In counting a motor vehicle on the freight car floor, two of the beams 35 and 40 in one of the grooves are associated with one end of the front axle, while two of the beams rearwardly of the first mentioned beams in the same groove, are associated with one end of the rear axle. Similarly, two of the beams in the other groove are associated with the other end of the front axle and two of the beams in the same groove but rearwardly of the first beams therein, are associated with the other end of the rear axle. Hence, the motor vehicle is positively secured to the floor of the freight car although manifestly it may be positioned anywhere along the grooves merely by adjusting the position of the beams and the anchor blocks.

In the modified arrangement shown by Fig. 5, instead of using the link 45 as shown by Fig. 2, a chain 50 is employed which is connected at opposite ends to pins 51 and 52 disposed in the slots 41 and 42. This chain cooperates with the bottom side of the axle 46 in a manner similar to the link 45 but being flexible will engage a greater circumferential area of the axle.

In associating the axle with the beams, the anchoring devices are moved toward each other which causes the free ends of the beams to move upwardly and apart. Then the axle is lifted into a position between the beams, following which the anchoring devices are moved apart until the parts assume positions as shown in Fig. 2. Removal of the anchoring device is effected in a reverse manner. Associating of the axle with the beams may also be effected by having the link 45 or chain 50, or at least one end thereof, readily removable from the slots in the beams.

From the above description it is apparent that the axles cannot move in any direction when once associated with the beams and hence the motor vehicle will not move during transportation thereof. Also it is apparent that when the loading devices are not in use, they are in an out-of-the-way position and the freight car may be used in the ordinary manner. It is apparent also that the loading devices provided are of simple construction, easy to operate, and that they are extremely durable. Moreover, when the devices are not being used, the beams are disposed in the grooves in the floor, and the cross bars of the beams not only close the grooves, but fitting the recesses 20' and 21', they in effect, lay flush with the floor and will support loads in the car in the same manner that the floor will support loads. Such parts of the beams also facilitate rolling or otherwise moving objects in the car over the grooves.

Although only certain forms of the invention have been illustrated and described in detail, it will be apparent to those skilled in the art that various modifications may be made without departing from the scope of the appended claims.

I claim:

1. In combination, a freight car having a groove directly in a wall thereof, anchoring devices in the groove adjustable relatively along such groove, links pivotally connected to the anchoring devices and extending toward each other, said links in their inoperative positions substantially closing the groove and presenting covering surfaces therefor substantially flush with the wall surface, and means movably connecting the free ends of the links and permitting substantially abutting of one link end with respect to the other when the links are disposed in the groove.

2. In combination, a freight car having a groove formed directly in a wall thereof, metal straps extending longitudinally of the groove in partially overlapping relation thereto and disposed respectively in shallow recesses formed in the wall at the sides of the groove so that the straps normally are substantially flush with the wall surface, anchoring devices adjustably mounted in the groove, a link pivotally connected to each anchoring device and being substantially T-shaped in cross section, the leg of the T being adapted to pass downwardly between the straps bordering the groove in the wall, the straps adjacent their inner edges having recesses in their outer surfaces, the cross bar of the T being adapted, when the link is moved downwardly into the groove, to fit in said shallow recess formed in the straps so as to present a substantially smooth wall surface, and means for connecting the adjacent ends of the link to a vehicle or the like.

3. In combination with a freight car or the like having a groove in the wall thereof which is substantially of T-shape, anchoring means slidable in the groove, substantially T-shaped bars pivotally connected to the anchoring means respectively and adapted to close the groove and be substantially flush with the floor surface when the bars are in one position, and means pivotally connecting the free ends of the bars.

SAMUEL D. BUTTERWORTH.